United States Patent
Au et al.

(10) Patent No.: US 8,248,938 B2
(45) Date of Patent: Aug. 21, 2012

(54) PREAMBLE MISS DETECTION IN TRANSMISSION OF MULTI-SLOT PACKETS

(75) Inventors: Jean P. L. Au, San Diego, CA (US);
Rashid A. Attar, San Diego, CA (US);
Naga Bhushan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 862 days.

(21) Appl. No.: 10/997,271

(22) Filed: Nov. 24, 2004

(65) Prior Publication Data

US 2006/0109810 A1 May 25, 2006

(51) Int. Cl.
*G08C 1/00* (2006.01)
(52) U.S. Cl. ........ 370/235; 370/328; 370/331; 370/374; 370/375; 455/436; 455/450; 714/748; 714/749
(58) Field of Classification Search .................. 370/338, 370/350–355, 235, 473, 474, 236, 329, 346, 370/394; 714/746–751; 455/436, 450
See application file for complete search history.

(56) References Cited

U.S. PATENT DOCUMENTS

| | | | |
|---|---|---|---|
| 4,901,307 A | 2/1990 | Gilhousen et al. | |
| 5,103,459 A | 4/1992 | Gilhousen et al. | |
| 6,101,168 A * | 8/2000 | Chen et al. | 370/228 |
| 6,389,056 B1 * | 5/2002 | Kanterakis et al. | 375/130 |
| 6,456,606 B1 * | 9/2002 | Terasawa | 370/331 |
| 6,625,172 B2 * | 9/2003 | Odenwalder et al. | 370/474 |
| 2003/0131299 A1 * | 7/2003 | Ahn et al. | 714/748 |
| 2004/0105406 A1 * | 6/2004 | Kayama et al. | 370/322 |
| 2005/0058154 A1 * | 3/2005 | Lee et al. | 370/473 |
| 2006/0165028 A1 * | 7/2006 | Hiraki et al. | 370/328 |

FOREIGN PATENT DOCUMENTS

| | | |
|---|---|---|
| EP | 1 533 933 | 5/2005 |
| WO | WO 03/096598 | 11/2003 |
| WO | WO 2004/063852 | 7/2004 |
| WO | WO 2005/032030 | 4/2005 |

OTHER PUBLICATIONS

International Search Report—PCT/US05/042534, International Searching Authority—European Patent Office, Mar. 6, 2006.
Written Opinion—PCT/US05/042534, International Searching Authority—European Patent Office, Mar. 6, 2006.
International Preliminary Report on Patentability—PCT/US05/042534, IPEA—European Patent Office, Feb. 19, 2007.

* cited by examiner

*Primary Examiner* — Amancio Gonzalez
(74) *Attorney, Agent, or Firm* — Rupit M. Patel

(57) ABSTRACT

A communication system (100) transmits data packets from a sender (120A) to a receiver (130A) using hybrid automatic repeat request processes. The sender redundantly encodes each packet, divides the packet into subpackets, and sends the subpackets to the receiver in a time-interlaced manner. When the receiver returns a positive acknowledgement of a subpacket using an acknowledgement channel, the sender terminates transmission of the subpackets. The sender interprets the signals on the acknowledgement channel using a metric resulting from correlation of the signals with positive and negative acknowledgement symbols. The sender interprets low correlation of the acknowledgement channel signal with both positive and negative acknowledgement symbols as a preamble miss, and terminates transmission of the subpackets. After termination, the packet may be rescheduled for transmission. Early termination of packet transmission after a preamble miss improves bandwidth utilization and decreases latency of the packet with the missed preamble.

78 Claims, 6 Drawing Sheets

PREAMBLE MISS DETECTION IN TRANSMISSION OF MULTI-SLOT PACKETS

BACKGROUND

1. Field

The present invention relates generally to data communications, and more specifically to preamble miss detection in communication systems using Automatic Repeat Request (ARQ) processes.

2. Background

A CDMA system may be designed to support one or more CDMA standards, such as (1) the "TIA/EIA-95 Mobile Station-Base Station Compatibility Standard for Dual-Mode Wideband Spread Spectrum Cellular System" (this standard with its enhanced revisions A and B will be referred to as the IS-95 standard), (2) the "TIA/EIA-98-C Recommended Minimum Standard for Dual-Mode Wideband Spread Spectrum Cellular Mobile Station" (the IS-98 standard), (3) the standard sponsored by a consortium named "3rd Generation Partnership Project" (3GPP) and embodied in a set of documents including Document Nos. 3G TS 25.211, 3G TS 25.212, 3G TS 25.213, and 3G TS 25.214 (the W-CDMA standard), (4) the standard sponsored by a consortium named "3rd Generation Partnership Project 2" (3GPP2) and embodied in a set of documents including "TR-45.5 Physical Layer Standard for cdma2000 Spread Spectrum Systems," the "C.S0005-A Upper Layer (Layer 3) Signaling Standard for cdma2000 Spread Spectrum Systems," (5) the "TIA/EIA/IS-856 cdma2000 High Rate Packet Data Air Interface Specification" (the cdma2000 1xEV-DO standard), and (6) certain other standards.

Examples CDMA communication systems are described in U.S. Pat. No. 4,901,307, entitled "Spread Spectrum Multiple Access Communication System Using Satellite or Terrestrial Repeaters," and in U.S. Pat. No. 5,103,459, entitled "System and Method for Generating Signal Waveforms in a CDMA Cellular Telephone System." Both patents are assigned to the assignee of the present invention and are incorporated herein by reference.

For example, a data packet may include, in addition to the information or payload bits, one or more parity bits, Cyclic Redundancy Check (CRC) bits, checksum bits, or a combination of such bits. These error-checking bits are calculated prior to transmission based on the information-carrying portion of the packet, such as payload and preamble, and then added to the packet. On the receiving end, error-detecting bits are recalculated based on the received information, and compared to the received error-checking bits to verify integrity of the packet.

To allow reconstruction of data that has been partially corrupted or lost during transmission, convolutional codes may be used to encode the data prior to transmission. Hamming and Reed-Solomon codes are examples of such codes. Convolutional encoding typically entails transforming a segment of $k_0$ symbols of an information frame or packet into a codeword of $n_0$ symbols. Because $k_0 < n_0$, encoding introduces redundancy into the transmitted data. The receiver may use the redundancy to reconstruct lost or corrupted symbols in the process of packet decoding, subject to various constraints. Decoders of convolutional codes include the Viterbi algorithm decoders and sequential decoders. Redundancy may also be introduced directly into the transmitted data stream through symbol repetition. Furthermore, information symbols may be interleaved in the transmitted data to spread out adjacent symbols, so that the receiver would be more likely to reconstruct data received with burst errors. Turbo codes, block codes, and other techniques may also be used for forward error correction.

For example, a packet may be divided into subpackets that are sent through a transmission channel in separate time slots. Because of redundant encoding, the information carried by the packet may be decoded from fewer than all subpackets of the packet. In some encoding schemes, the entire packet may be decoded from a single subpacket.

This situation may occur, for example, when the receiver cannot decode the packet's preamble, which is included in the first subpacket and identifies the intended receiver.

SUMMARY

Embodiments disclosed herein address the above stated needs by providing a base station apparatus that includes a transmitter, a receiver, and a processor coupled to the transmitter and to the receiver. The processor is configured to divide a packet, for example a packet received from a BSC, into a plurality of subpackets, cause the transmitter to send the subpackets to an AT, and cause the transmitter to terminate transmission of the subpackets when the receiver does not receive a positive Acknowledgement (ACK) or a Negative Acknowledgement (NAK) message from the AT in response to at least one of the subpackets. The transmitter and the receiver may communicate with the AT using wireless code division multiple access techniques. The transmitter may transmit the subpackets to the AT in a time-interlaced manner, i.e., interleaved with subpackets of other packets that may be sent to other ATs. Further, the packet may be redundantly encoded, for example, encoded so that the entire packet may be decoded from fewer than all subpackets of the packet, and a preamble identifying the AT may be appended to the first subpacket.

In accordance with other aspects of the invention, the apparatus may generate a first metric, for example, by measuring correlation of energy on an acknowledgement channel with known ACK and NAK symbols. The apparatus may determine that an ACK message was received if the first metric falls within a first range, determine that a NAK message was received if the first metric falls within a NAK range, and determine that neither ACK nor NAK message was received if the first metric falls within neither ACK nor ACK ranges. If neither ACK nor NAK message was received, the apparatus terminates transmission of the subpackets of the packet.

In accordance with still other aspects of the invention, the apparatus may compute a cumulative metric by summing the first metrics computed for each subpacket, and use the cumulative metric to determine whether neither ACK nor NAK message has been received.

These and other aspects of the present invention will be better understood with reference to the following description, drawings, and appended claims.

DETAILED DESCRIPTION

Figure 1:
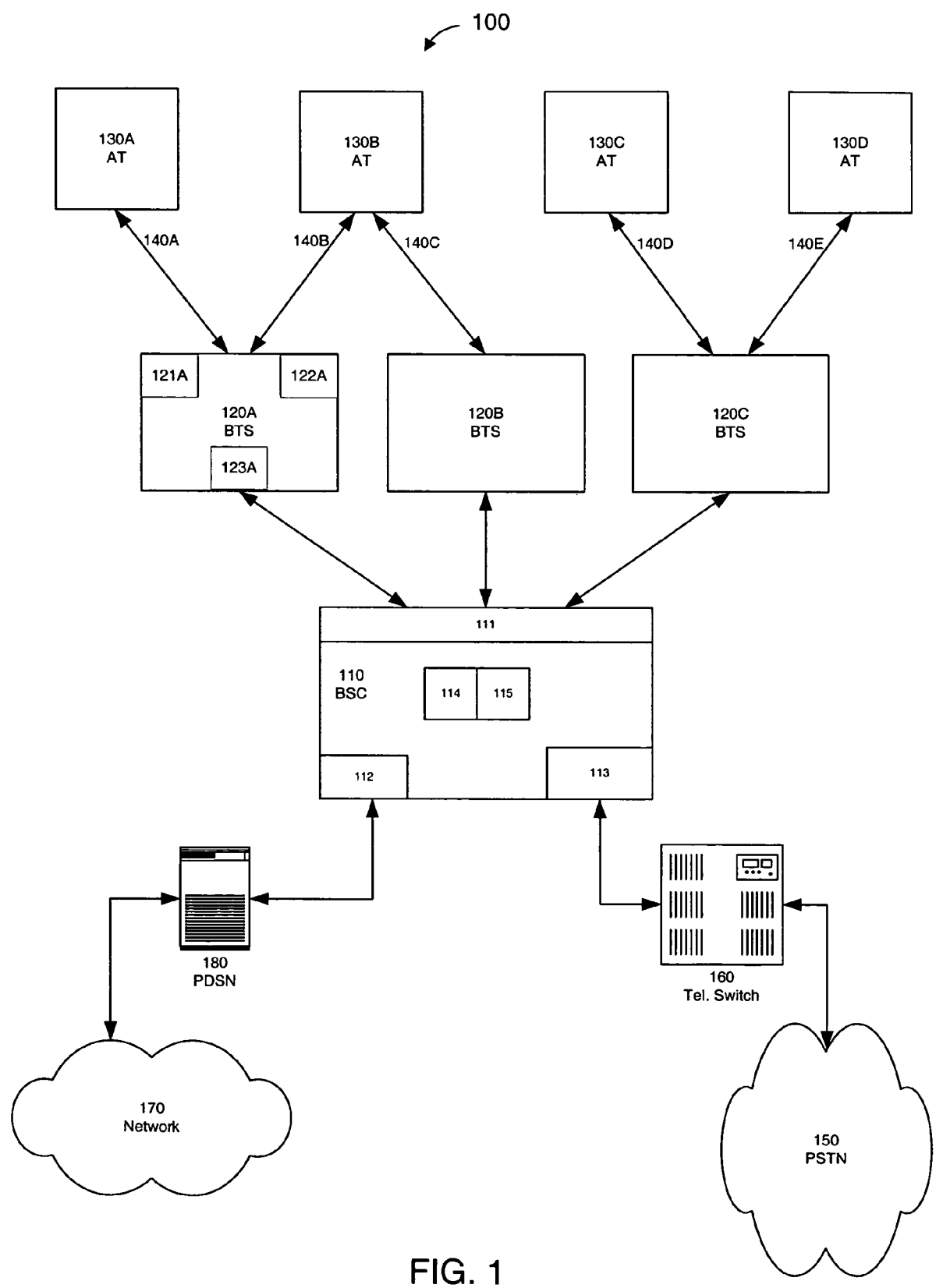
FIG. 1 is a diagram illustrating selected components of a communication network capable of operating in accordance with various aspects of the invention.

A modern communication system is expected to provide reliable data transmission for a variety of applications, such as voice and data applications. In a point-to-multipoint communications context, known communication systems are based on Frequency Division Multiple Access (FDMA), time division multiple access, Code Division Multiple Access (CDMA), and perhaps other multiple access communication schemes.

Data transmission typically involves some finite probability of data loss or corruption. For example, data may be corrupted by noise, interference, multipath fading, and Doppler effects due to relative movement of receiver and transmitter. To counteract data loss and corruption, various error detection and correction techniques have been developed and are known in the art.

Notwithstanding the presence of error correction techniques, some packets or portions thereof may be lost or corrupted beyond the receiver's capability to reconstruct them. In some applications, such packets or portions thereof may be retransmitted. Retransmission may be automatic. Moreover, retransmission may be combined with redundant encoding.

Terminating subpacket transmission after the receiver decodes the packet—and before all subpackets have been transmitted—may improve bandwidth utilization, decrease interference, and reduce power consumption. Toward this end, some CDMA receivers send positive Acknowledgement (ACK) messages after successfully decoding a packet, and Negative Acknowledgement (NAK) messages when the packet is received but cannot be successfully decoded. Both ACK and NAK messages may be sent on a separate acknowledgement channel. One problem with such systems arises when a particular receiver is not aware the subpackets are addressed to it.

In other words, the preamble is "missed." The receiver will then ignore all subpackets of the packet. Therefore, the receiver will send neither a positive acknowledgement nor a negative acknowledgement. The transmitter may continue to send the subpackets for a predetermined number of times, such as sixteen times, wasting bandwidth resources. If the transmitter could detect the preamble "miss" at an earlier time, transmission of the subpackets could be terminated at the earlier time or soon thereafter, and the waste of bandwidth resources could be avoided. Moreover, the packet could be retransmitted sooner, decreasing the packet's latency.

There is therefore a need in the art for methods and apparatus for improving transmitter identification of receiver preamble misses before all subpackets of a packet are sent.

In this document, the words "embodiment," "variant," and similar expressions refer to particular apparatus or process, and not necessarily to the same apparatus or process. Thus, "one embodiment" (or a similar expression) used in one place or context may refer to a particular apparatus or process; the same or a similar expression in a different place may refer to a different apparatus or process. The expression "alternative embodiment" and similar phrases are used to indicate one of a number of different possible embodiments. The number of potential embodiments is not necessarily limited to two or any other quantity.

The word "exemplary" is used herein to mean "serving as an example, instance, or illustration." Any embodiment described herein as "exemplary" is not necessarily to be construed as preferred or advantageous over other embodiments.

A subscriber station, referred to herein as an Access Terminal (AT), may be mobile or stationary, and may communicate with one or more BTSs. An AT transmits and receives data packets to or from a Base Station Controller (BSC) through one or more BTSs. BTSs and BSCs are parts of a network called an Access Network (AN). An AN may transport data packets between multiple ATs. The AN may be further connected to additional networks outside the AN, such as a corporate intranet, the Internet, or a conventional Public Switched Telephone Network (PSTN), and may transport data packets between each AT and such outside networks. An AT that has established an active traffic channel connection with one or more BTSs is called an active AT, and is said to be in a traffic state. An AT that is in the process of establishing an active traffic channel connection with one or more BTSs is said to be in a connection setup state. An AT may be any data device that communicates through a wireless channel or through a wired channel, for example, using fiber optic or coaxial cables. An AT may further be any of a number of types of devices including but not limited to PC card, compact flash, external or internal modem, wireless or wireline phone, or a Personal Digital Assistant (PDA). The communication link through which the AT sends signals to the BTS is called a reverse link. The communication link through which a BTS sends signals to an AT is called a forward link.

FIG. 1 illustrates selected components of a communication network 100, which includes a Base Station Controller (BSC) 110 coupled to Base Station Wireless Transceiver Systems (BTS) 120A, 120B, and 120C. The BTSs 120 communicate with ATs 130A, 130B, 130C, and 130D through wireless connections 140A through 140E. The BSC 110 is coupled to a Public Switched Telephone Network (PSTN) 150 through a telephone switch 160, and to a packet switched network 170 through a Packet Data Server Node (PDSN) 180. Data interchange between various network elements, such as the BSC 110 and the packet data server node 180, may be implemented using any number of protocols, for example, the Internet Protocol (IP), an Asynchronous Transfer Mode (ATM) protocol, T1, E1, frame relay, and other protocols.

In the illustrated embodiment, the communication network 100 provides both data communication services and telephone services to the ATs 130. In alternative embodiments, the communication network 100 may provide only data or only telephone services. In yet other alternative embodiments, the communication network 100 may provide additional services, such as video transmission services, either alone or in combination with telephone services, data services, and other services.

The ATs 130 may include wireless telephones, wireless modems, personal digital assistants, wireless local loop apparatus, and other communication devices. Each AT 130 is configured to communicate data using at least one transmission protocol, such as the wireless packet transmission protocols described above. The ATs 130 communicate with the BTSs 120 via communication channels 140A through 140E, as shown in FIG. 1. Each communication channel 140 includes a forward link and a reverse link to a corresponding AT 130.

Each of the BTSs 120 includes one or more wireless receivers (such as a receiver 121A of the transceiver 120A), one or more wireless transmitters (such as a transmitter 122A of the transceiver 120A), and a BSC interface (such as an interface 123A). A receiver/transmitter pair of each base station is configured by a processor operating under control of program code to establish forward and reverse links with the ATs 130 in order to send data packets to and receive data packets from the ATs 130. In the case of data services, for example, the BTSs 120 receive forward link data packets from the packet switched network 170 through the packet data server node 180 and through the BSC 110, and transmit these packets to the ATs 130. The BTSs 120 receive reverse link data packets that originate at the ATs 130, and forward these packets to the packet switched network 170 through the BSC 110 and the packet data server node 180. In the case of telephone services, the BTSs 120 receive forward link data packets from the telephone network 150 through the telephone switch 160 and through the BSC 110, and transmit these packets to the ATs 130. Voice carrying packets originating at the ATs 130 are received at the BTSs 120 and forwarded to the telephone network 150 via the BSC 110 and the telephone switch 160.

It should be noted that in the immediately preceding paragraph and elsewhere in this document, the expression "data packets" signifies information carrying packets in the most general sense. Thus, "data packets" may carry conventional data such as internet protocol packets, digitized telephone audio, digitized video, or any other type of digitized information.

It should also be noted that in some alternative embodiments, the transmitter and the receiver of each transceiver have separate processors.

The BSC 110 includes one or more interfaces 111 to the BTSs 120, an interface 112 to the packet data server node 180, and an interface 113 to the telephone switch 160. The interfaces 111, 112, and 113 operate under control of one or more processors 114 executing program code stored in a memory device 115.

As illustrated in FIG. 1, the network 100 includes one public switched telephone network, one packet switched network, one BSC, three transceivers, and four ATs. A person skilled in the art would recognize, after perusal of this document, that alternative embodiments in accordance with aspects of the invention need not be limited to any particular number of these components. For example, a lesser or a greater number of BTSs and ATs may be included in some embodiments. Furthermore, the communication network 100 may connect the ATs 130 to one or more additional communication networks, for example, a second wireless communication network having a number of wireless ATs.

In one embodiment, the network 100 operates substantially in accordance with the IS-95 standard, as follows. An AT, for example, the AT 130A, receives pilots from one or more BTSs 120 and reports the pilots' strengths to the BSC 110 via one of the BTSs 120 and one of the communication links 140. The BSC 110 selects an active BTS 120 for the AT 130A, for example, the transceiver 120A. The active BTS 120A exchanges signaling information with the AT 130A, for example, signaling information used to establish an active traffic channel. Once the active traffic channel is established, the AT 130A sends data packets to and receives data packets from portions of the AN (e.g., the transceivers 120, the controller 110, PDSN 180, and the switch 160) through the communication link (e.g., 140A) corresponding to the active transceiver (e.g., 120A). The BTS may similarly establish and maintain an active traffic channel to a second AT, such as the AT 130B.

The maximum data rate of the forward link connection between the AT 130A and the BTS 120A is generally a function of the Signal-to-Interference-and-Noise Ratio (SINR) of the forward link. The AT 130A monitors the SINR, predicts its value for each packet, and reports the predicted SINR value to the AN. The actual data rate for the packet may then be conservatively selected not to exceed the maximum data rate, which is based on the predicted SINR.

The data packets on the forward channel are divided into subpackets that are sent in separate time slots. The first subpacket of each packet carries a preamble, which includes information identifying the AT to which the packet is sent. Subsequent subpackets of the same packet do not carry preambles. Because of redundant encoding, each subpacket may be decoded to obtain the information carried by the entire packet.

An ARQ scheme is implemented to terminate transmission of the subpackets after the AT 130A successfully decodes the packet. According to the scheme, the AT 130A attempts to decode a packet whenever it receives a subpacket of the packet. When the packet is correctly decoded, the AT 130A sends an ACK indication to the BTS 120A. If the AT 130A is unable to decode the packet, it sends a NAK indication to the transceiver 120A. When the transceiver 120A receives an ACK indication, it terminates transmission of the remaining subpackets of the packet, and uses the time slots that are freed by the termination to transmit another packet to the AT 130A, 130B, 130C, or 130D.

To provide the AT 130A with sufficient time to decode the packet before transmission of the next subpacket, subpackets of a single packet are generally interlaced with subpackets of other packets, for example, packets intended for other ATs. In some embodiments, three time slots appear between consecutive subpackets of a packet.

Figure 2:
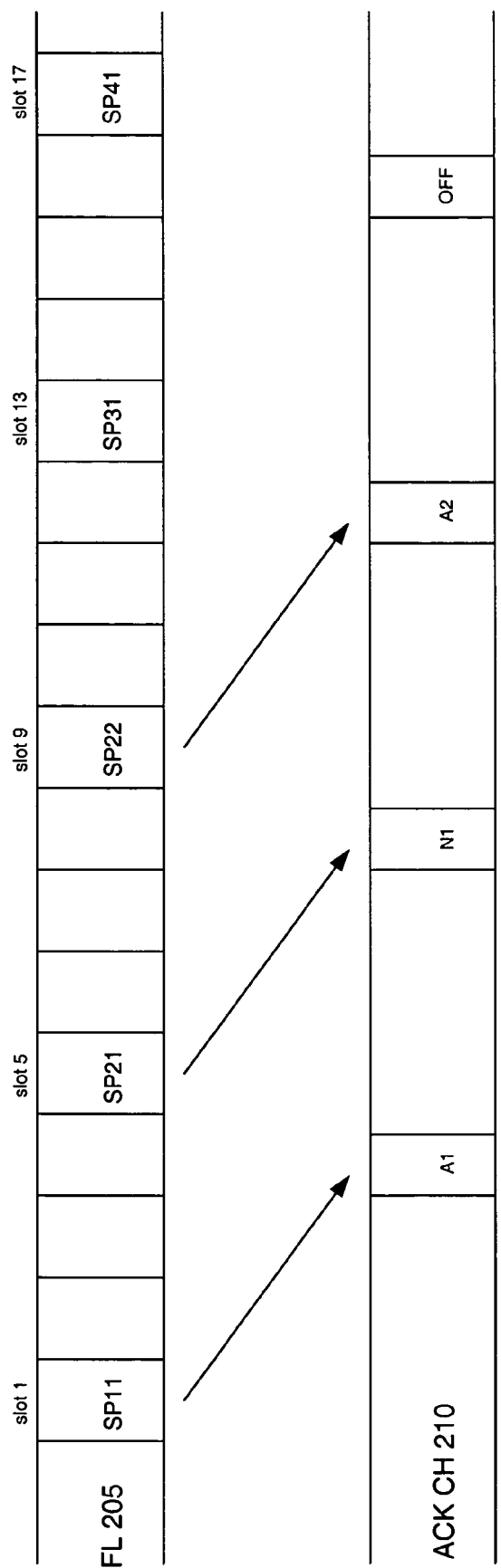
FIG. 2 illustrates transmission of packets on a forward link, and receipt of positive and negative acknowledgement indications on an acknowledgement reverse channel, in accordance with various aspects of the invention.

FIG. 2 illustrates transmission of packets on a forward link 205 and receipt of ACK and NAK indications on an acknowledgement reverse channel 210. In time slot 1, the transceiver 120A transmits a first subpacket SP11 of a first packet. A second subpacket SP12 of the first packet is scheduled for transmission in time slot 5, but because the transceiver 120A receives an ACK indication A1 from the AT 130A prior to the time slot 5, transmission of SP12 and any remaining subpackets of the first packet is terminated, and transmission of a second packet is scheduled in the same time slot. Consequently, a first subpacket SP21 of the second packet is transmitted in the time slot 5. Unlike the previous case, the AT 130A was unable to decode the second packet from the subpacket SP21 and sent a NAK indication N1. Therefore, the transceiver 120A sends a second subpacket SP22 of the second packet in a time slot 9. This time, the AT 130A decodes the second packet and sends an ACK indication A2. The transceiver 120A terminates transmission of additional subpackets of the second packet, and instead transmits a first subpacket SP31 of a third packet in a time slot 13. To further understand the scenario of FIG. 2, consider the potential states of sender and receiver in this communication.

Figure 3:
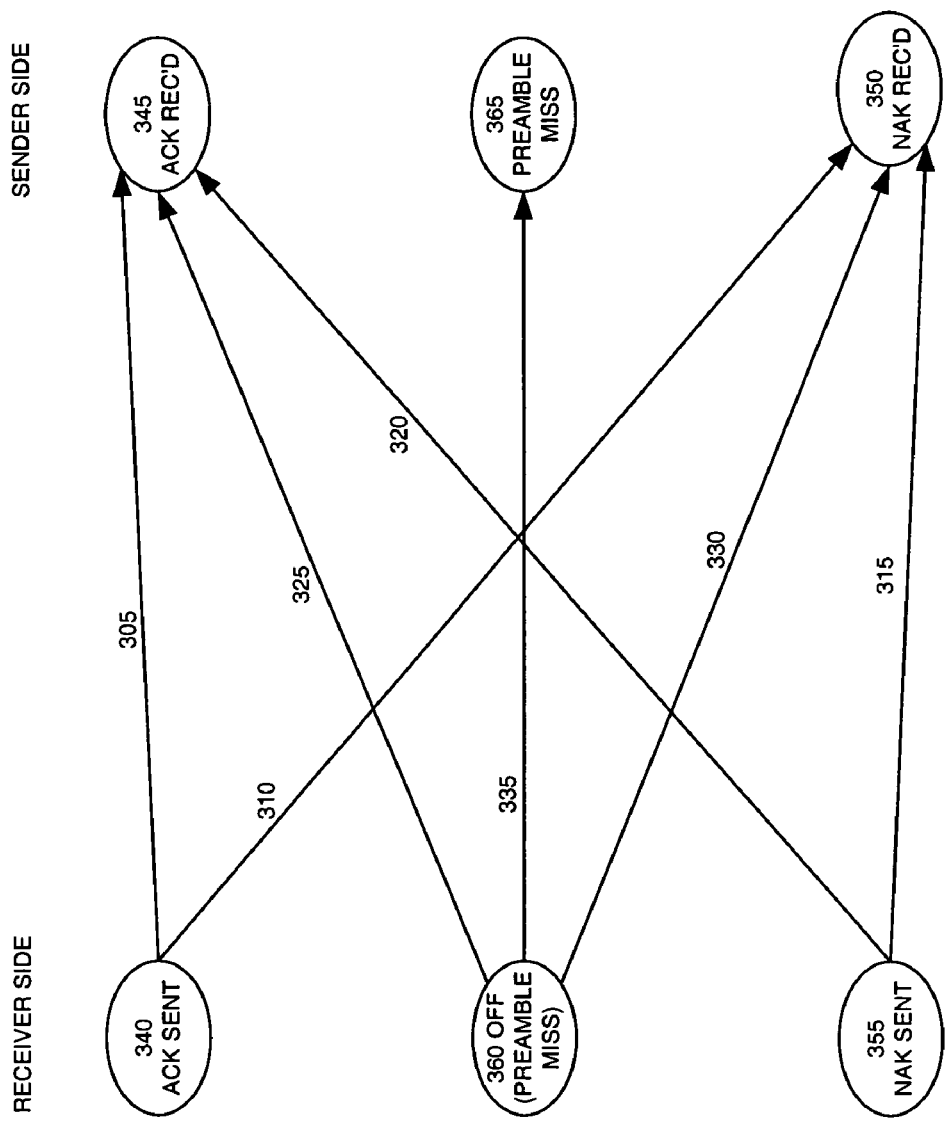
FIG. 3 is an illustration of receiver states and resulting sender states, in accordance with various aspects of the invention.

As has been briefly mentioned above, the ARQ mechanism may cause a waste of bandwidth resources and excessive latency when an AT misses a packet's preamble. In some communication systems implementing ARQ processes such as the process described above, a sender always interprets information received on the acknowledgement channel as either an ACK or a NAK indication. As illustrated in FIG. 3, several distinct outcomes may take place with regard to an acknowledgement channel indication or lack thereof. If the receiver decodes the packet and sends an ACK indication, the sender may correctly decode and interpret the indication as an ACK indication. This possibility is depicted as an arrow 305 between an ACK SENT state 340 of the receiver and an ACK RECEIVED state 345 of the sender. On the other hand, the sender may incorrectly interpret the ACK indication as a NAK indication. This possibility corresponds to an arrow 310 between the ACK SENT state 340 and a NAK RECEIVED state 350 of the sender. Similarly, a NAK indication may be interpreted correctly or incorrectly, as shown by arrows 315 (from a NAK SENT state 355 of the receiver to the NAK RECEIVED state 350 of the sender) and 320 (between the NAK SENT state 355 and the ACK RECEIVED state 345), respectively.

Arrows 325, 330, and 335 correspond to an OFF state 360 of the acknowledgement indicator, i.e., to the state that arises when the receiver misses the preamble and transmits neither an ACK indication nor a NAK indication. As has already been discussed, the sender may interpret the energy in the acknowledgement channel as either an ACK or a NAK, even when the receiver has not sent any signal on the acknowledgement channel. Thus, the arrow 325 corresponds to the possibility that the energy of the acknowledgement channel will be interpreted as an ACK indication, while the arrow 330 corresponds to the possibility that the acknowledgement channel energy will be interpreted as a NAK indication, in the absence of any indication being sent by the receiver.

Consequences of the false positive acknowledgement 325 may be similar to the consequences of the false positive acknowledgement 320. In both cases transmission of subsequent subpackets will be terminated without the data packet being decoded by the receiver. The data packet may be recovered by a higher level protocol implementing error correction processes or ARQ, or cause a "glitch" in the received data stream.

An immediate consequence of the false negative acknowledgement possibility 330 is that the sender will continue to transmit the subpackets of the data packet until all packets have been transmitted, or until a false positive acknowledgement 325 takes place. This wastes bandwidth resources and increases latency.

It should be noted that in many communication systems, the ACK/NAK decision is heavily biased in favor of NAK in order to avoid false positive acknowledgements that lead to packet loss. For this reason, the probability ($P_{fNAK}$) of false negative acknowledgement 330 may be much greater than the probability ($P_{fA}$) of the false positive acknowledgement 325. In some systems, the bias is such that $P_{fNAK} \geq 10 * P_{fA}$, which, in the absence of additional measures, may result in relatively large loss of bandwidth resources when a preamble is missed.

Reference numeral 365 designates PREAMBLE MISS state of the sender. In this state, the sender (e.g., the transceiver 120A of FIG. 1) interprets the energy received on the acknowledgement channel as a preamble miss at the receiver (e.g., at the AT 130A). When the sender detects a preamble miss and enters the state 365, it terminates transmission of subsequent subpackets of the packet whose preamble was missed. The packet may be retransmitted later, decreasing the packet's latency, or dropped. In either case, bandwidth utilization is enhanced.

Continuing with the discussion of the example in FIG. 2, the AT 130A does not decode the preamble in the subpacket SP31 and therefore sends neither an ACK nor NAK that corresponds to the time slot 13. In accordance with an embodiment of the present invention, the BTS 120A correctly interprets the energy on the acknowledgement channel 210 as absence of both ACK and NAK indications, and terminates transmission of the third packet. Instead, the transceiver 120A reschedules transmission of the third packet for a later time, and transmits a first subpacket SP41 of a fourth packet in time slot 17.

In distinguishing among the ACK RECEIVED state 345, NACK RECEIVED state 350, and PREAMBLE MISS state 365, the BTS 120A may use one or more signal metrics generated from the signal energy on the acknowledgement channel. For example, a log likelihood ratio may be generated by correlating the received acknowledgement channel signal with ACK and NAK symbols, which are known a priori. In normal operation, the ACK SENT state 340 is likely to generate a relatively high correlation of the received acknowledgement channel signal to the ACK symbol(s), and a relatively low correlation to the NAK symbol(s). Conversely, the NAK SENT state 355 is likely to generate a relatively high correlation of the received acknowledgement channel signal to the NAK symbol(s), and a relatively low correlation to the ACK symbol(s). The OFF state 360 (preamble miss) is likely to result in low correlations of the received acknowledgement channel signal to both the ACK and NAK symbols. The transceiver 120A may correctly interpret such low correlations, and transition to the PREAMBLE MISS state 365, as denoted by the arrow 335.

It is possible that the ACK SENT state 340 and NAK SENT state 355 of the AT will be mistakenly interpreted as a PREAMBLE MISS 365 by the transceiver. This will result in termination of transmission of the subpackets despite reception and decoding of the preamble at the receiver.

The log likelihood ratio or other metrics derived from the signal on the acknowledgement channel may be generated by a digital signal processor (DSP) of a demodulator of the BTS 120A, such as a CSM 5500 demodulator of the assignee of this invention.

Figure 4:
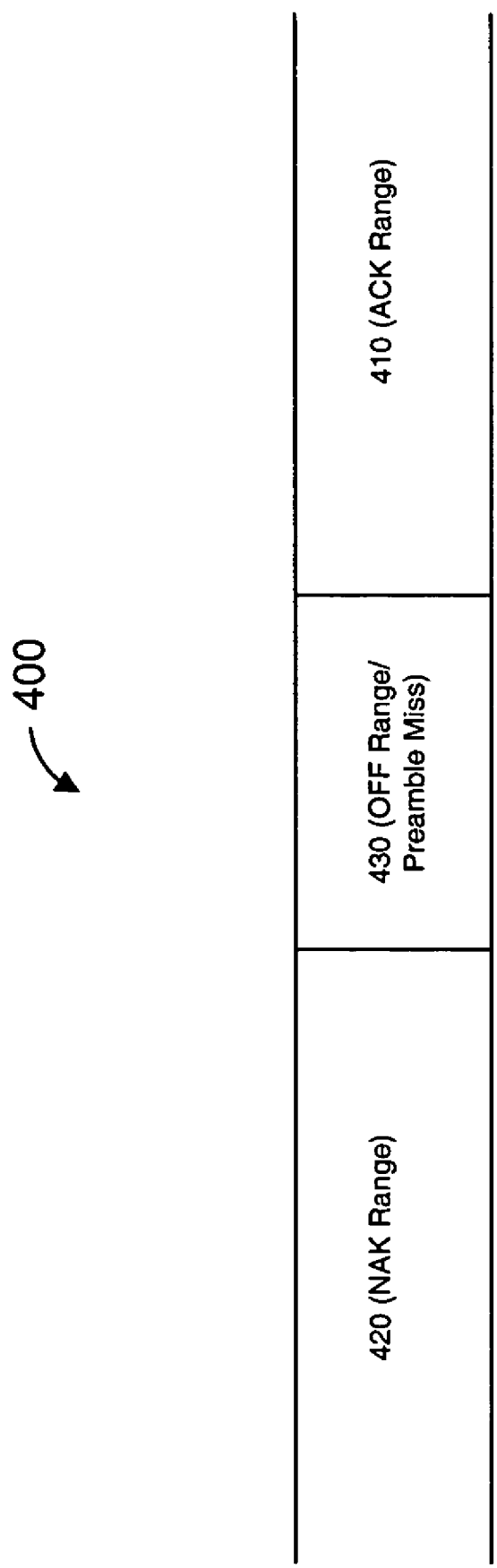
FIG. 4 illustrates positive acknowledgement, negative acknowledgement, and preamble miss ranges of an acknowledgement signal metric, which may be used in accordance with various aspects of the invention.
Figure 5:
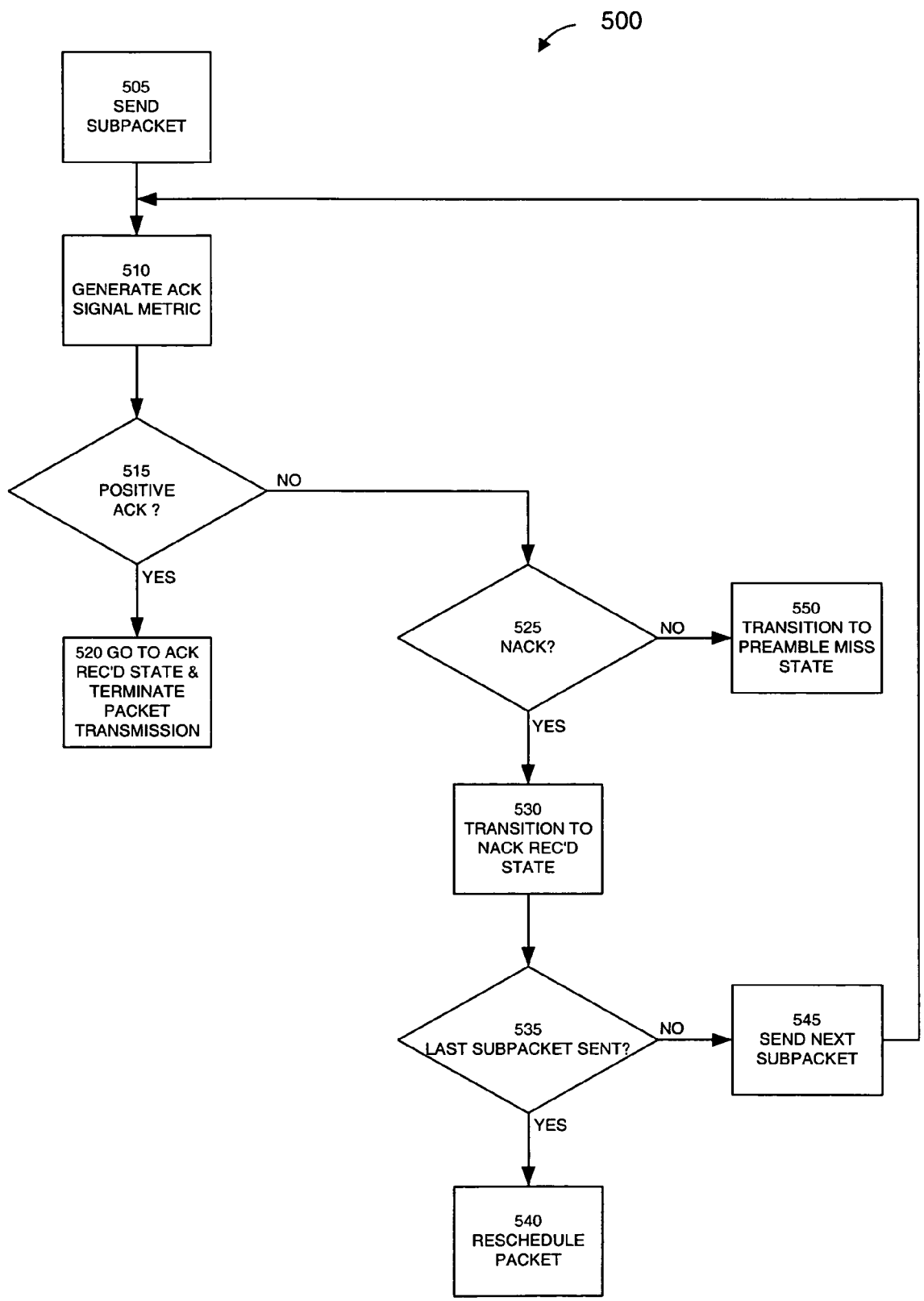
FIG. 5 is a flowchart illustrating selected steps of a process for deciding whether a preamble miss has occurred, in accordance with various aspects of the invention.

In some embodiments, the BTS 120A decides whether a preamble miss has taken place after each decoding of the signal on the acknowledgement channel. For example, the potential span of an exemplary scalar metric that correlates the received acknowledgement signal energy with both ACK and NAK symbols is divided into three non-overlapping ranges. This is illustrated in FIG. 4 and FIG. 5. In FIG. 4, a span 400 includes an ACK range 410, a NAK range 420, and an OFF range 430. It should be noted that the ACK and NAK ranges need not be equal to each other, need not be bounded on both sides, and need not be arranged symmetrically with respect to some particular reference point, such as zero. When the metric, such as a log likelihood ratio, falls within the ACK range 410, the transceiver 120A interprets the acknowledgement signal as a positive acknowledgement and enters the ACK RECEIVED state 345 of FIG. 3. When the metric falls within the NAK range 420, the transceiver 120A interprets the acknowledgement signal as a negative acknowledgement and enters the NAK RECEIVED state 350. If the metric falls within the OFF range 430, the transceiver 120A interprets the acknowledgement signal as a preamble miss and enters the PREAMBLE MISS state 365.

FIG. 5 illustrates selected steps of a process 500 for deciding whether a preamble miss has occurred, as described above. At step 505, a BTS sends a subpacket of a packet to an AT using a forward link. At step 510, the transceiver receives and decodes a signal on an acknowledgement channel that corresponds to the sent subpacket, generating the signal's acknowledgement metric A. At decision block 515, the transceiver determines whether the metric A is within a positive acknowledgement range $R_{ACK}$. If the metric A falls within the range $R_{ACK}$, the transceiver transitions into the ACK RECEIVED state and terminates transmission of additional subpackets of the packet, at step 520.

If the metric A does not fall within the rang $R_{ACK}$, process flow proceeds to a decision block 525, where the transceiver determines whether the metric A is within a negative acknowledgement range $R_{NAK}$. If the metric A falls within the range $R_{NAK}$, the transceiver transitions into the NAK RECEIVED state, at step 530. The transceiver then determines, at decision block 535, whether the last subpacket of the packet has been sent. If the last subpacket has been sent, the transceiver may reschedule transmission of the packet for a later time, at step 540. If one or more additional subpackets of the packet remain to be sent, the transceiver sends the next subpacket of the packet, at step 545, and returns to the step 510.

If the metric A does not fall within either the $R_{ACK}$ or $R_{NAK}$ range, process flow proceeds from the decision block 525 to step 550. In this step, the transceiver transitions to the PREAMBLE MISS state and terminates transmission of additional subpackets of the packet. The time slots previously assigned to the packet may be reassigned to other packets to be sent to the same AT or to another receiver. The terminated packet may be rescheduled for transmission to the AT.

As a person skilled in the art would understand after perusal of this document, the metric used in making the ACK/NAK/OFF decision need not be limited to the log likelihood ratio, or to a one-dimensional metric. Generally, ACK and NAK regions may be defined in a multi-dimensional metric space, and the ACK/NAK/OFF state decision may be made based on the position of a multi-dimensional metric vector (point) in the space: position in the ACK or NAK regions may correspond to the ACK RECEIVED state 345 and NAK RECEIVED state 350, respectively, while a position outside these regions may correspond to the PREAMBLE MISS state 365.

In some embodiments, the BTS 120A does not decide whether a preamble miss has taken place until after two or more subpackets of a packet have been sent. In these embodiments, the metrics of the acknowledge channel signal corresponding to the first N(N≧2) subpackets of a packet are stored in the transceiver 120A. The stored metrics are combined to determine whether a preamble miss has taken place. For example, an absolute value of a scalar metric $A_j$ of the acknowledgement channel signal may be computed for each subpacket j of a particular packet, and summed over all received subpackets to obtain a cumulative metric sum $S_j$ corresponding to the packet, as follows:

$$S_j = \sum_{i=1}^{i=j} |A_i|$$

The metric sum $S_j$ is then compared to a threshold $T_j$, which may be a function of the subpacket number j. If $S_j < T_j$, for example, the BTS 120A may decide that a preamble miss has taken place and enter the OFF state 365. Otherwise, the transceiver 120A decides between the ACK RECEIVED state 345 and the NAK RECEIVED state 350 using conventional rules, for example, comparing the subpacket's metric ($A_j$ or $S_j$) to a predefined threshold.

Figure 6:
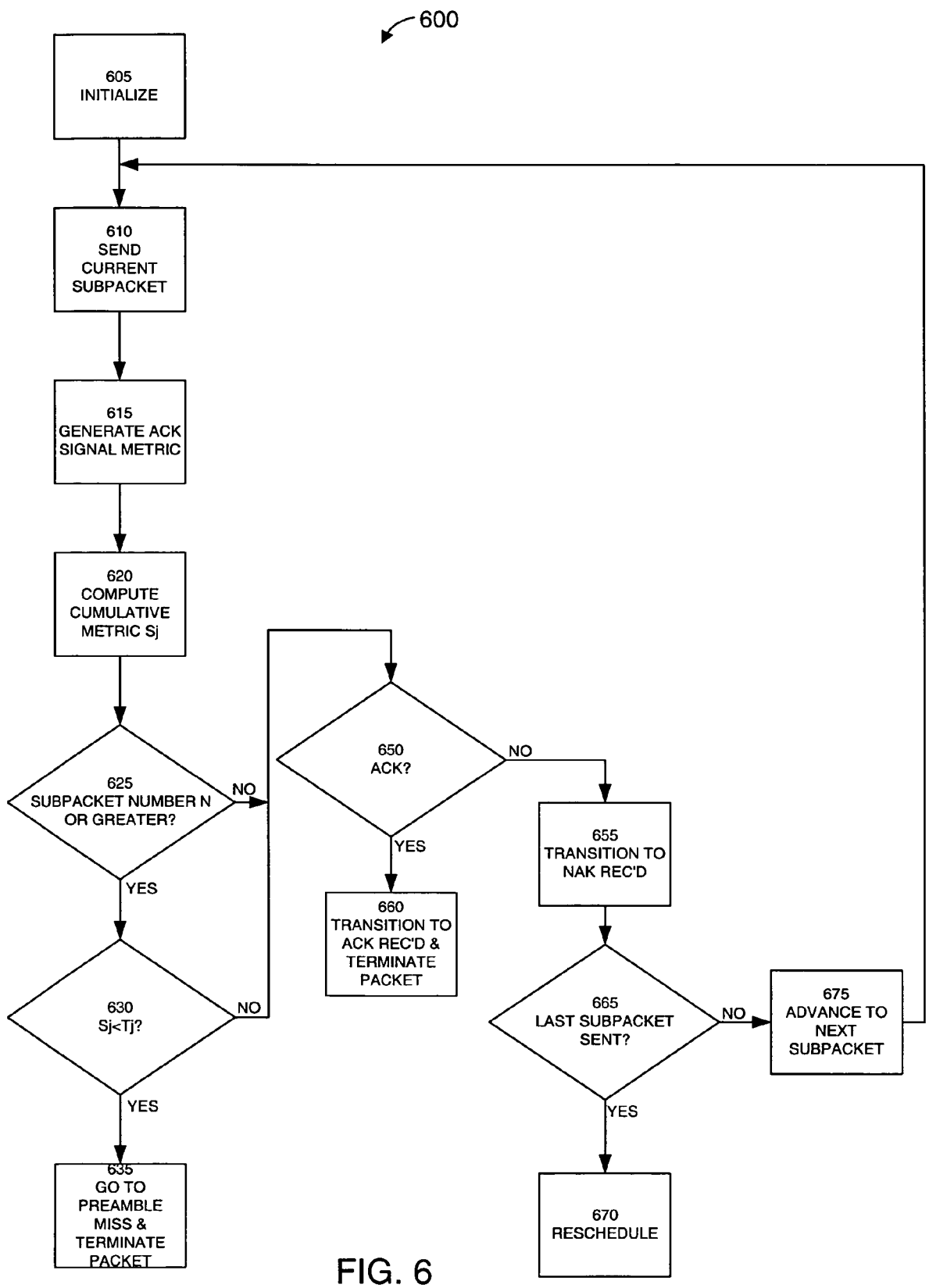
FIG. 6 is a flowchart illustrating selected steps of another process for deciding whether a preamble miss has occurred, in accordance with various aspects of the invention.

FIG. 6 illustrates selected steps of a process 600 for detecting preamble misses. In this process, the BTS does not attempt to decide whether a preamble miss has taken place until after N subpackets have been sent, as described above.

At step 605 the process is initialized. Initialization includes clearing (zeroing) a memory location that stores the cumulative metric of the acknowledgement channel, and setting the current subpacket pointer to the first subpacket of a packet. The BTS transmits the current subpacket to the AT in step 610. At step 615, the transceiver receives and decodes a signal on the acknowledgement channel, and the signal's acknowledgement metric $A_j$ is generated. At step 620, a cumulative metric $S_j$ is computed. This may be done by adding the metric $A_j$ corresponding to the current subpacket to the memory location that stores the cumulative metric $S_j$.

In decision block 625 a determination is made whether at least N subpackets of the packet have been sent. If at least N subpackets have been sent, process flow proceeds to step 630, where the cumulative metric $S_j$ is compared to the threshold $T_j$ corresponding to the subpacket, in decision block 630. If the comparison indicates a preamble miss (e.g., $S_j < T_j$), the transceiver transitions to the PREAMBLE MISS state and terminates the packet, in step 635. The packet may then be rescheduled for transmission.

When the comparison in the decision block 630 does not indicate a preamble miss, process flow proceeds to decision block 650, where a determination is made whether the signal on the acknowledgement channel corresponds to a positive acknowledgement or to a negative acknowledgement. This decision may be carried out, for example, by comparing the metric A to a predetermined threshold. If a positive acknowledgement was received, process flow proceeds to step 660, where the transceiver transitions to the ACK RECEIVED state and terminates remaining subpackets of the packet. If a negative acknowledgement was received, the transceiver transitions to the NAK RECEIVED state in step 655.

From the step 655, process flow advances to decision block 665 to determine whether the last subpacket of the packet has been sent. If the last subpacket has been sent, the packet may be rescheduled for transmission, in step 670. If one or more subpackets remain, process flow proceeds to step 675 to advance the current subpacket pointer to the next subpacket of the packet. Process flow then returns to the step 610, in which the transceiver sends the next subpacket to the AT.

Returning to the decision block 625, if fewer than N subpackets have been sent, process flow proceeds to the decision block 650, and continues along the path discussed above.

Although steps of various methods (including methods 500 and 600) are described serially in this document, method steps may be interchanged without departing from the scope of the invention. Indeed, it should be noted that certain steps may be performed by separate elements in conjunction or in parallel, synchronously or asynchronously, in a pipelined manner, or otherwise.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill in the art would further appreciate, after perusal of this document, that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

Those skilled in the art would also understand, after perusal of this document, that the invention need not be limited to base station apparatus, to CDMA systems, or to wireless communication systems in general.

The various illustrative logical blocks, modules, and circuits described in connection with the embodiments disclosed herein may be implemented or performed with a general purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor may read information from, and write information to, the storage medium. In the alternative, the storage medium may be integral to the processor. The processor and the storage medium may reside in an ASIC. The ASIC may reside in a BTS, BSC, or another part of an AN. In the alternative, the processor and the storage medium may reside as discrete components in a BTS, BSC, or another part of the AN.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein, but is to be accorded the widest scope consistent with the principles and novel features disclosed herein.

What is claimed is:

1. A Base Station Transceiver System (BTS) comprising:
a receiver to receive an acknowledgement channel;
a base station interface; and
a transmitter configured to accept a packet through the base station interface, divide the packet into a plurality of subpackets, transmit the subpackets and terminate transmission of the subpackets on a traffic channel when a measured energy metric at the BTS of the acknowledgment channel corresponding to at least one transmitted subpacket is detected and is insufficient to be one of a positive acknowledgement (ACK) or a negative acknowledgement (NAK) message.

2. The BTS of claim 1, wherein the transmitter is configured to send the subpackets to the AT in a time-interlaced manner.

3. The BTS of claim 2, wherein the transmitter and the receiver operate wirelessly.

4. The BTS of claim 2, wherein the transmitter and the receiver operate in accordance with a code division multiple access communication technique.

5. The BTS of claim 2, wherein the transmitter is configured to encode the packet redundantly.

6. The BTS of claim 2, wherein the transmitter is configured to encode the packet redundantly before dividing the packet into the plurality of subpackets so that the packet may be decoded from fewer than all subpackets.

7. The BTS of claim 2, wherein the transmitter is configured to:
redundantly encode the packet, before dividing the packet into the plurality of subpackets so that the packet may be decoded from any subpacket of the plurality of packets, and
append a preamble to a first subpacket of the plurality of subpackets, the preamble identifying the AT.

8. The BTS of claim 2, wherein the receiver and the transmitter are configured to generate a likelihood ratio metric from energy on the acknowledgement channel and use the likelihood ratio metric to determine when an ACK message is received, when a NAK message is received, and when neither ACK nor NAK message is received.

9. The BTS of claim 2, wherein the receiver and the transmitter are configured to generate one or more metrics from energy on the acknowledgement channel and use the one or more metrics to determine when an ACK message is received, when a NAK message is received, and when neither ACK nor NAK message is received.

10. The BTS of claim 2, wherein the receiver and the transmitter are configured to:
generate one or more metrics by measuring correlation of energy on the acknowledgement channel with known ACK and NAK symbols; and
use the one or more metrics to determine when an ACK message is received, when a NAK message is received, and when neither ACK nor NAK message is received.

11. The BTS of claim 10, wherein the receiver and the transmitter are configured to determine whether an ACK message is received, a NAK message is received, or neither ACK nor NAK message is received in response to each subpacket of the plurality of subpackets.

12. The BTS of claim 2, wherein the receiver and the transmitter are configured to:
generate a first metric by measuring correlation of energy on the acknowledgement channel with known ACK and NAK symbols for each subpacket of the plurality of subpackets;
compute a cumulative metric after determining each first metric by summing the first metrics computed for each subpacket; and
use the cumulative metric to determine when an ACK message is received, when a NAK message is received, and when neither ACK nor NAK message is received.

13. The BTS of claim 2, wherein the receiver and the transmitter are configured to:
generate a first metric by measuring correlation of energy on the acknowledgement channel with known ACK and NAK symbols for each subpacket of the plurality of subpackets;
compute a cumulative metric after determining each first metric by summing the first metrics computed for each subpacket; and
determine that an ACK message was received when the cumulative metric is within an ACK range,
a NAK message was received when the cumulative metric is within a NAK range, and
neither ACK nor NAK message was received when the cumulative metric is not in the ACK or NAK range.

14. The BTS of claim 13, wherein at least one range of the ACK and NAK ranges depends on number of first metrics summed in the cumulative metric.

15. The BTS of claim 2, wherein the receiver and the transmitter are configured to:
generate a first metric by measuring correlation of energy on the acknowledgement channel with known ACK and NAK symbols for each subpacket of the plurality of subpackets;
compute a cumulative metric after determining each first metric by summing the first metrics computed for each subpacket; and
determine that an ACK message was received when the cumulative metric is within an ACK range;
determine that a NAK message was received when the cumulative metric is within a NAK range; and
determine that neither ACK nor NAK message was received when the cumulative metric is not in the ACK or NAK range and at least two subpackets of the plurality of packets have been sent;
wherein at least one range of the ACK and NAK ranges depends on number of first metrics summed in the cumulative metric.

16. A base station apparatus comprising:
a transmitter;
a receiver to receive an acknowledgement channel; and
at least one processor coupled to the transmitter and to the receiver, wherein the at least one processor is configured to divide a packet into a plurality of subpackets, cause the transmitter to send the subpackets to an AT (Access Terminal); and cause the transmitter to terminate transmission of the subpackets on a traffic channel when a measured energy metric at the base station apparatus of the acknowledgment channel corresponding to at least one transmitted subpacket is detected and is insufficient to be one of a positive acknowledgement (ACK) or a negative acknowledgement (NAK) message.

17. The base station apparatus of claim 16, wherein the transmitter is configured to send the subpackets to the AT in a time-interlaced manner.

18. The base station apparatus of claim 17, wherein the transmitter and the receiver operate wirelessly.

19. The base station apparatus of claim 17, wherein the transmitter and the receiver operate in accordance with a code division multiple access communication technique.

20. The base station apparatus of claim 17, wherein the at least one processor is configured to encode the packet redundantly.

21. The base station apparatus of claim 17, wherein the at least one processor is configured to encode the packet redundantly before dividing the packet into the plurality of subpackets so that the packet may be decoded from fewer than all subpackets.

22. The base station apparatus of claim 17, wherein the at least one processor is configured to:
redundantly encode the packet before dividing the packet into the plurality of subpackets so that the packet may be decoded from any subpacket of the plurality of packets, and
append a preamble to a first subpacket of the plurality of subpackets, the preamble identifying the AT.

23. The base station apparatus of claim 17, wherein the at least one processor is configured to generate a likelihood ratio metric from energy on the acknowledgement channel and use the likelihood ratio metric to determine when an ACK message is received, when a NAK message is received, and when neither ACK nor NAK message is received.

24. The base station apparatus of claim 17, wherein the at least one processor is configured to generate one or more metrics from energy on the acknowledgement channel and use the one or more metrics to determine when an ACK message is received, when a NAK message is received, and when neither ACK nor NAK message is received.

25. The base station apparatus of claim 17, wherein the at least one processor is configured to:
generate one or more metrics by measuring correlation of energy on the acknowledgement channel with known ACK and NAK symbols; and
use the one or more metrics to determine when an ACK message is received, when a NAK message is received, and when neither ACK nor NAK message is received.

26. The base station apparatus of claim 25, wherein the at least one processor is configured to determine whether an ACK message is received, a NAK message is received, or neither ACK nor NAK message is received in response to each subpacket of the plurality of subpackets.

27. The base station apparatus of claim 17, wherein the at least one processor is configured to:
generate a first metric by measuring correlation of energy on the acknowledgement channel with known ACK and NAK symbols for each subpacket of the plurality of subpackets;
compute a cumulative metric after determining each first metric by summing the first metrics computed for each subpacket;
use the cumulative metric to determine when an ACK message is received, when a NAK message is received, and when neither ACK nor NAK message is received.

28. The base station apparatus of claim 17, wherein the at least one processor is configured to:
generate a first metric by measuring correlation of energy on the acknowledgement channel with known ACK and NAK symbols for each subpacket of the plurality of subpackets;
compute a cumulative metric after determining each first metric by summing the first metrics computed for each subpacket; and
determine that
an ACK message was received when the cumulative metric is within an ACK range,
a NAK message was received when the cumulative metric is within a NAK range, and
neither ACK nor NAK message was received when the cumulative metric is not in the ACK or NAK range.

29. The base station apparatus of claim 28, wherein at least one range of the ACK and NAK ranges depends on number of first metrics summed in the cumulative metric.

30. The base station apparatus of claim 17, wherein the at least one processor is configured to:
generate a first metric by measuring correlation of energy on the acknowledgement channel with known ACK and NAK symbols for each subpacket of the plurality of subpackets;
compute a cumulative metric after determining each first metric by summing the first metrics computed for each subpacket; and
determine that an ACK message was received when the cumulative metric is within an ACK range;

determine that a NAK message was received when the cumulative metric is within a NAK range; and determine that neither ACK nor NAK message was received when the cumulative metric is not in the ACK or NAK range and at least two subpackets of the plurality of packets have been sent;

wherein at least one range of the ACK and NAK ranges depends on number of first metrics summed in the cumulative metric.

31. A wireless communication system comprising:
a Base Station Transceiver System (BTS) comprising:
a transmitter,
a receiver to receive an acknowledgement channel, and
at least one processor coupled to the transmitter and to the receiver, wherein the at least one processor is configured to divide a packet into a plurality of subpackets, cause the transmitter to send the subpackets to an AT (Access Terminal), and cause the transmitter to terminate transmission of the subpackets on a traffic channel when a measured energy metric at the BTS of the acknowledgment channel corresponding to at least one transmitted subpacket is detected and is insufficient to be one of a positive acknowledgement (ACK) or a negative acknowledgement (NAK) message; and a BSC configured to provide the packet to the BTS.

32. The wireless communication system of claim 31, wherein the transmitter is configured to send the subpackets to the AT in a time-interlaced manner.

33. The wireless communication system of claim 32, wherein the transmitter and the receiver operate in accordance with a code division multiple access communication technique.

34. The wireless communication system of claim 32, wherein the at least one processor is configured to encode the packet redundantly.

35. The wireless communication system of claim 32, wherein the at least one processor is configured to encode the packet redundantly before dividing the packet into the plurality of subpackets so that the packet may be decoded from fewer than all subpackets.

36. The wireless communication system of claim 32, wherein the at least one processor is configured to:
redundantly encode the packet before dividing the packet into the plurality of subpackets so that the packet may be decoded from any subpacket of the plurality of packets, and
append a preamble to a first subpacket of the plurality of subpackets, the preamble identifying the AT.

37. The wireless communication system of claim 32, wherein the at least one processor is configured to generate a likelihood ratio metric from energy on the acknowledgement channel and use the likelihood ratio metric to determine when an ACK message is received, when a NAK message is received, and when neither ACK nor NAK message is received.

38. The wireless communication system of claim 32, wherein the at least one processor is configured to generate one or more metrics from energy on the acknowledgement channel and use the one or more metrics to determine when an ACK message is received, when a NAK message is received, and when neither ACK nor NAK message is received.

39. The wireless communication system of claim 32, wherein the at least one processor is configured to:
generate one or more metrics by measuring correlation of energy on the acknowledgement channel with known ACK and NAK symbols; and
use the one or more metrics to determine when an ACK message is received, when a NAK message is received, and when neither ACK nor NAK message is received.

40. The wireless communication system of claim 39, wherein the at least one processor is configured to determine whether an ACK message is received, a NAK message is received, or neither ACK nor NAK message is received in response to each subpacket of the plurality of subpackets.

41. The wireless communication system of claim 32, wherein the at least one processor is configured to:
generate a first metric by measuring correlation of energy on the acknowledgement channel with known ACK and NAK symbols for each subpacket of the plurality of subpackets;
compute a cumulative metric after determining each first metric by summing the first metrics computed for each subpacket;
use the cumulative metric to determine when an ACK message is received, when a NAK message is received, and when neither ACK nor NAK message is received.

42. The wireless, communication system of claim 32, wherein the at least one processor is configured to:
generate a first metric by measuring, correlation of energy on the acknowledgement channel with known ACK and NAK symbols for each subpacket of the plurality of subpackets;
compute a cumulative metric after determining each first metric by summing the first metrics computed for each subpacket; and
determine that
an ACK message was received when the cumulative metric is within an ACK range,
a NAK message was received when the cumulative metric is within a NAK range, and
neither ACK nor NAK message was received when the cumulative metric is not in the ACK or NAK range.

43. The wireless communication system of claim 42, wherein at least one range of the ACK and NAK ranges depends on number of first metrics summed in the cumulative metric.

44. The wireless communication system of claim 32, wherein the at least one processor is configured to:
generate a first metric by measuring correlation of energy on the acknowledgement channel with known ACK and NAK symbols for each subpacket of the plurality of subpackets;
compute a cumulative metric after determining each first metric by summing the first metrics computed for each subpacket;
determine that an ACK message was received when the cumulative metric is within an ACK range;
determine that a NAK message was received when the cumulative metric is within a NAK range; and
determine that neither ACK nor NAK message was received when the cumulative metric is not in the ACK or NAK range and at least two subpackets of the plurality of packets have been sent;
wherein at least one range of the ACK and NAK ranges depends on number of first metrics summed in the cumulative metric.

45. A Base Station Transceiver System (BTS) comprising:
a transmitter capable of sending a plurality of subpackets of a packet to an AT (Access Terminal);
a receiver to receive an acknowledgement channel capable of receiving positive and negative acknowledgement messages from the AT responsive to receipt of the subpackets; and means for terminating transmission of the subpackets on a traffic channel when a measured energy metric at the BTS of the acknowledgment channel corresponding to at least one transmitted subpacket is detected and is insufficient to be one of a positive acknowledgement (ACK) or a negative acknowledgement (NAK) message.

46. The BTS of claim 45, wherein the means for terminating comprises means for terminating transmission of the subpackets after each subpacket.

47. The BTS of claim 45, wherein the means for terminating terminates transmission responsive to a cumulative metric obtained by summing metrics measuring correlation of energy on the acknowledgement channel with known ACK and NAK symbols.

48. The BTS of claim 47, wherein the means for terminating does not terminate transmission until at least two of the subpackets have been received.

49. A method for transmitting, a packet from a Base Station Transceiver System (BTS) to an AT (Access Terminal), the method comprising:
 dividing the packet into a plurality of subpackets;
 sending the subpackets to the AT; receiving energy on an acknowledgement channel capable of carrying positive acknowledgement (ACK) and negative acknowledgement (NAK) messages from the AT in response to the subpackets; and
 terminating transmission of the subpackets on a traffic channel when a measured energy metric at the BTS of the acknowledgment channel corresponding to at least one transmitted subpacket is detected and is insufficient to be one of a positive acknowledgement (ACK) or a negative acknowledgement (NAK) message.

50. The method of claim 49, wherein the step of sending comprises transmitting the subpackets in a time-interlaced manner.

51. The method of claim 50, wherein the step of transmitting comprises transmitting the subpackets wirelessly.

52. The method of claim 50, wherein the step of transmitting comprises transmitting the subpackets using code division multiple access communication technique.

53. The method of claim 50, further comprising redundantly encoding the packet before the step of sending.

54. The method of claim 50, further comprising redundantly encoding the packet so that the packet may be decoded from fewer than all subpackets.

55. The method of claim 54, further comprising appending a preamble to a first subpacket of the plurality of subpackets, wherein the preamble identifies the AT.

56. The method of claim 50, further comprising:
 generating a likelihood ratio metric from the energy on the acknowledgement channel; and
 using the likelihood ratio metric to determine when an ACK message is received, when a NAK message is received, and when neither ACK nor NAK message is received.

57. The method of claim 50, further comprising:
 generating one or more metrics from the energy on the acknowledgement channel; and
 using the one or more metrics to determine when an ACK message is received, when a NAK message is received, and when neither ACK nor NAK message is received.

58. The method of claim 50, further comprising:
 generating one or more metrics by measuring correlation of the energy on the acknowledgement channel with known ACK and NAK symbols; and
 using the one or more metrics to determine when an ACK message is received, when a NAK message is received, and when neither ACK nor NAK message is received.

59. The method of claim 58, wherein the step of using comprises:
 determining whether an ACK message is received, a NAK message is received, or neither ACK nor NAK message is received in response to each subpacket of the plurality of subpackets.

60. The method of claim 50, further comprising:
 generating a first metric by measuring correlation of the energy on the acknowledgement channel with known ACK and NAK symbols for each subpacket of the plurality of subpackets;
 computing a cumulative metric after determining each first metric by summing the first metrics computed for each subpacket;
 using the cumulative metric to determine when an ACK message is received, when a NAK message is received, and when neither ACK nor NAK message is received.

61. The method of claim 50, further comprising:
 generating a first metric by measuring correlation of the energy on the acknowledgement channel with known ACK and NAK symbols for each subpacket of the plurality of subpackets;
 computing a cumulative metric after determining each first metric by summing the first metrics computed for each subpacket; and
 determining that
  an ACK message was received when the cumulative metric is within an ACK range,
  a NAK message was received when the cumulative metric is within a NAK range, and
  neither ACK nor NAK message was received when the cumulative metric is not in the ACK or NAK range.

62. The method of claim 61, wherein at least one range of the ACK and NAK ranges depends on number of first metrics summed in the cumulative metric.

63. The method of claim 50, further comprising:
 generating a first metric by measuring correlation of the energy on the acknowledgement channel with known ACK and NAK symbols for each subpacket of the plurality of subpackets;
 computing a cumulative metric after determining each first metric by summing the first metrics computed for each subpacket;
 determining that an ACK message was received when the cumulative metric is within an ACK range;
 determining that a NAK message was received when the cumulative metric is within a NAK range; and
 determining that neither ACK nor NAK message was received when the cumulative metric is not in the ACK or NAK range and at least two subpackets of the plurality of packets have been sent;
 wherein at least one range of the ACK and NAK ranges depends on number of first metrics summed in the cumulative metric.

64. A computer readable media embodying a method for transmitting a packet from a Base Station Transceiver System (BTS) to an AT (Access Terminal), the method comprising:
 dividing the packet into a plurality of subpackets;
 sending the subpackets to the AT;
 receiving energy on acknowledgement channel capable of carrying positive acknowledgement (ACK) and negative acknowledgement (NAK) messages from the AT in response to the subpackets; and terminating transmission of the subpackets on a traffic channel when a measured energy metric at the BTS of the acknowledgment channel corresponding to at least one transmitted subpacket is detected and is insufficient to be one of a positive acknowledgement (ACK) or a negative acknowledgement (NAK) message.

65. The computer readable media of claim 64, wherein the step of sending comprises transmitting the subpackets in a time-interlaced manner.

66. The computer readable media of claim 65, wherein the step of transmitting comprises transmitting the subpackets wirelessly.

67. The computer readable media of claim 65, wherein the step of transmitting comprises transmitting the subpackets using code division multiple access communication technique.

68. The computer readable media of claim 65, wherein the method further comprises redundantly encoding the packet.

69. The computer readable media of claim 65, wherein the method further comprises redundantly encoding the packet so that the packet may be decoded from fewer than all subpackets.

70. The computer readable media of claim 69, wherein the method further comprises appending a preamble to a first subpacket of the plurality of subpackets, wherein the preamble identifies the AT.

71. The computer readable media of claim 65, wherein the method further comprises:
generating a likelihood ratio metric from the energy on the acknowledgement channel; and
using the likelihood ratio metric to determine when an ACK message is received, when a NAK message is received, and when neither ACK nor NAK message is received.

72. The computer readable media of claim 65, wherein the method further comprises:
generating one or more metrics from the energy on the acknowledgement channel; and
using the one or more metrics to determine when an ACK message is received, when a NAK message is received, and when neither ACK nor NAK message is received.

73. The computer readable media of claim 65, wherein the method further comprises:
generating one or more metrics by measuring correlation of the energy on the acknowledgement channel with known ACK and NAK symbols; and
using the one or more metrics to determine when an ACK message is received, when a NAK message is received, and when neither ACK nor NAK message is received.

74. The computer readable media of claim 73, wherein the step of using comprises:
determining whether an ACK message is received, a NAK message is received, or neither ACK nor NAK message is received in response to each subpacket of the plurality of subpackets.

75. The computer readable media of claim 65, wherein the method further comprises:
generating a first metric by measuring correlation of the energy on the acknowledgement channel with known ACK and NAK symbols for each subpacket of the plurality of subpackets;
computing a cumulative metric after determining each first metric by summing the first metrics computed for each subpacket;
using the cumulative metric to determine when an ACK message is received, when a NAK message is received, and when neither ACK nor NAK message is received.

76. The computer readable media of claim 65, wherein the method further comprises:
generating a first metric by measuring correlation of the energy on the acknowledgement channel with known ACK and NAK symbols for each subpacket of the plurality of subpackets;
computing a cumulative metric after determining each first metric by summing the first metrics computed for each subpacket; and
determining that
an ACK message was received when the cumulative metric is within an ACK range,
a NAK message was received when the cumulative metric is within a NAK range, and
neither ACK nor NAK message was received when the cumulative metric is not in the ACK or NAK range.

77. The computer readable media of claim 76, wherein at least one range of the ACK and NAK ranges depends on number of first metrics summed in the cumulative metric.

78. The computer readable media of claim 65, wherein the method further comprises:
generating a first metric by measuring correlation of the energy on the acknowledgement channel with known ACK and NAK symbols for each subpacket of the plurality of subpackets;
computing a cumulative metric after determining each first metric by summing the first metrics computed for each subpacket;
determining that an ACK message was received when the cumulative metric is within an ACK range;
determining that a NAK message was received when the cumulative metric is within a NAK range; and
determining that neither ACK nor NAK message was received when the cumulative metric is not in the ACK or NAK range and at least two subpackets of the plurality of packets have been sent;
wherein at least one range of the ACK and NAK ranges depends on number of first metrics summed in the cumulative metric.

* * * * *